(12) United States Patent
Chism et al.

(10) Patent No.: US 6,973,176 B1
(45) Date of Patent: Dec. 6, 2005

(54) METHOD AND APPARATUS FOR ROTATING AUTO RESERVE AGENTS

(75) Inventors: Kimberly D. Chism, Denver, CO (US); Joylee E. Kohler, Northglenn, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 219 days.

(21) Appl. No.: 10/676,761

(22) Filed: Sep. 30, 2003

(51) Int. Cl.[7] .............................................. H04M 3/00
(52) U.S. Cl. ................................. 379/265.12; 379/266
(58) Field of Search .................................. 379/265.12

(56) References Cited

U.S. PATENT DOCUMENTS

| | | | |
|---|---|---|---|
| 4,486,626 A | 12/1984 | Kohler | 179/18 |
| 5,206,903 A | 4/1993 | Kohler et al. | 379/309 |
| 5,392,346 A | 2/1995 | Hassler et al. | 379/265 |
| 5,721,770 A | 2/1998 | Kohler | 379/266 |
| 5,825,869 A * | 10/1998 | Brooks et al. | 379/265.12 |
| 5,828,747 A | 10/1998 | Fisher et al. | 379/309 |
| 5,903,641 A | 5/1999 | Tonisson | 379/266 |
| 5,905,793 A | 5/1999 | Flockhart et al. | 379/266 |
| 5,982,873 A | 11/1999 | Flockhart et al. | 379/266 |
| 6,052,460 A | 4/2000 | Fisher et al. | 379/266 |
| 6,061,347 A | 5/2000 | Hollatz et al. | 370/352 |
| 6,088,441 A | 7/2000 | Flockhart et al. | 379/265 |
| 6,157,655 A | 12/2000 | Shtivelman | 370/412 |
| 6,163,607 A | 12/2000 | Bogart et al. | 379/266 |
| 6,173,053 B1 | 1/2001 | Bogart et al. | 379/266 |
| 6,192,122 B1 | 2/2001 | Flockhart et al. | 379/266 |
| 6,347,139 B1 | 2/2002 | Fisher et al. | 379/265.12 |
| 6,353,667 B1 | 3/2002 | Foster et al. | 379/265.05 |
| 6,359,982 B1 | 3/2002 | Foster et al. | 379/266.06 |
| 6,366,666 B2 | 4/2002 | Bengtson et al. | 379/265.06 |
| 6,389,400 B1 | 5/2002 | Bushey et al. | 705/7 |
| 6,424,709 B1 | 7/2002 | Doyle et al. | 379/265 |
| 6,434,230 B1 | 8/2002 | Gabriel | 379/265.01 |
| 6,510,221 B1 | 1/2003 | Fisher et al. | 379/265.12 |
| 6,535,601 B1 | 3/2003 | Flockhart et al. | 379/266.01 |
| 6,636,598 B1 * | 10/2003 | Thomson et al. | 379/265.05 |
| 2003/0002653 A1 * | 1/2003 | Uckun | 379/266.06 |
| 2003/0223569 A1 * | 12/2003 | Flockhart et al. | 379/220.01 |

OTHER PUBLICATIONS

U.S. Appl. No. 09/492,513, filed Jan. 27, 2000, Jensen.
U.S. Appl. No. 09/521,795, filed Mar. 9, 2000, Mullen.

* cited by examiner

*Primary Examiner*—Creighton Smith
(74) *Attorney, Agent, or Firm*—Sheridan Ross P.C.

(57) ABSTRACT

The present invention relates to the reservation (or holding back or restricting) of agents with respect to work requiring particular agent skills. In particular, the present invention allows a limited number of agents to be reserved based on agent occupancy or on a number of agent skills. A process implementing the present invention may be performed in real-time, such that a determination as to whether an agent should be reserved with respect to a particular agent skill or queue is determined as agents complete assigned work items and become available to do other work.

27 Claims, 6 Drawing Sheets

METHOD AND APPARATUS FOR ROTATING AUTO RESERVE AGENTS

FIELD OF THE INVENTION

The present invention relates to the duty assignment of agents associated with an enterprise. In particular, the present invention relates to the automatic reservation of agents to handle work related to particular skills based on the occupancies of the agents.

BACKGROUND OF THE INVENTION

Various systems have been developed to allocate work among agents associated with an enterprise. For example, automatic call distribution systems are available that are capable of distributing calls to call handling agents according to some predefined criteria. If a call arrives and there is no available agent, the call is placed in a queue to await an available agent. Likewise, if an agent becomes available for a call or queue and there is no call waiting for service, the agent is placed in a queue to await the arrival of a call.

In order to improve the efficiency with which calls are handled, calls and agents are typically segregated according to defined skills. In particular, calls that require a particular agent skill to handle are preferably placed in call queues that are serviced by agents having that agent skill. Although such systems can increase customer satisfaction with respect to the accuracy with which a call is handled, problems in efficiently allocating agents to service the various queues can be created.

In order to ensure that service level targets are met with respect to call queues, systems may act to move agents from queues in which service level targets are being met to underserved queues. In particular, such systems can automatically reserve agents to receive work from a particular queue. Although such techniques can help meet service level targets with respect to a particular queue, inequalities in the distribution of work among individual agents can result.

In order to address the equitable allocation of work to agents, systems have distributed calls to agents in inverse order of their individual occupancies. However, this approach does not address inequalities between the workloads of agents assigned to different call queues. For example, because automatic call distribution systems have not limited the number of agents that can be reserved to receive calls from a particular call queue to any administered maximum, agent queues having very low agent occupancies can develop, even though other agent queues from the same system have comparatively high agent occupancies. The inability of such systems to allocate work loads equally among agents results in different agents being required to perform different amounts of work, and/or does not fairly allocate the opportunity to earn commissions among agents.

SUMMARY OF THE INVENTION

The present invention is directed to solving these and other problems and disadvantages of the prior art. According to the present invention, each agent queue associated with a particular agent skill is assigned a maximum number of agents that can be reserved for the skill. When an agent having a first agent skill becomes available, that agent may be reserved to serve only the first agent queue associated with the first agent skill, if the assigned maximum number of agents for the agent queue has not been reached. If the assigned maximum number of agents reserved for the first agent queue has been reached, the available agent may, under certain circumstances, replace an agent already reserved to service calls or requests for service that are associated with the first skill and that are therefore directed to the first queue for service.

In accordance with an embodiment of the present invention, an agent having only a first skill may replace an agent having multiple skills that is already reserved in an agent queue associated with the first skill. In accordance with another embodiment of the present invention, an agent having multiple skills, including a first skill, that becomes available may replace another agent having multiple skills that is already assigned to an agent queue associated with the first skill if the agent already reserved for the agent queue has a lower occupancy than the available agent. If a number of agents have a lower occupancy than the available agent, the agent having the lowest occupancy is released from the queue and is replaced by the available agent.

The process of detecting available agents and assigning such agents to queues requiring skills possessed by the available agent can be performed continuously. Accordingly, agents may be efficiently allocated among queues based on their skills in realtime. In addition, the work loads or occupancies of individual agents are assessed to assist in distributing equal amounts of work to individual agents.

These and other advantages and features of the present invention will become more apparent from the following description of illustrative embodiments of the invention, taken together with the drawings.

DETAILED DESCRIPTION

Figure 1:
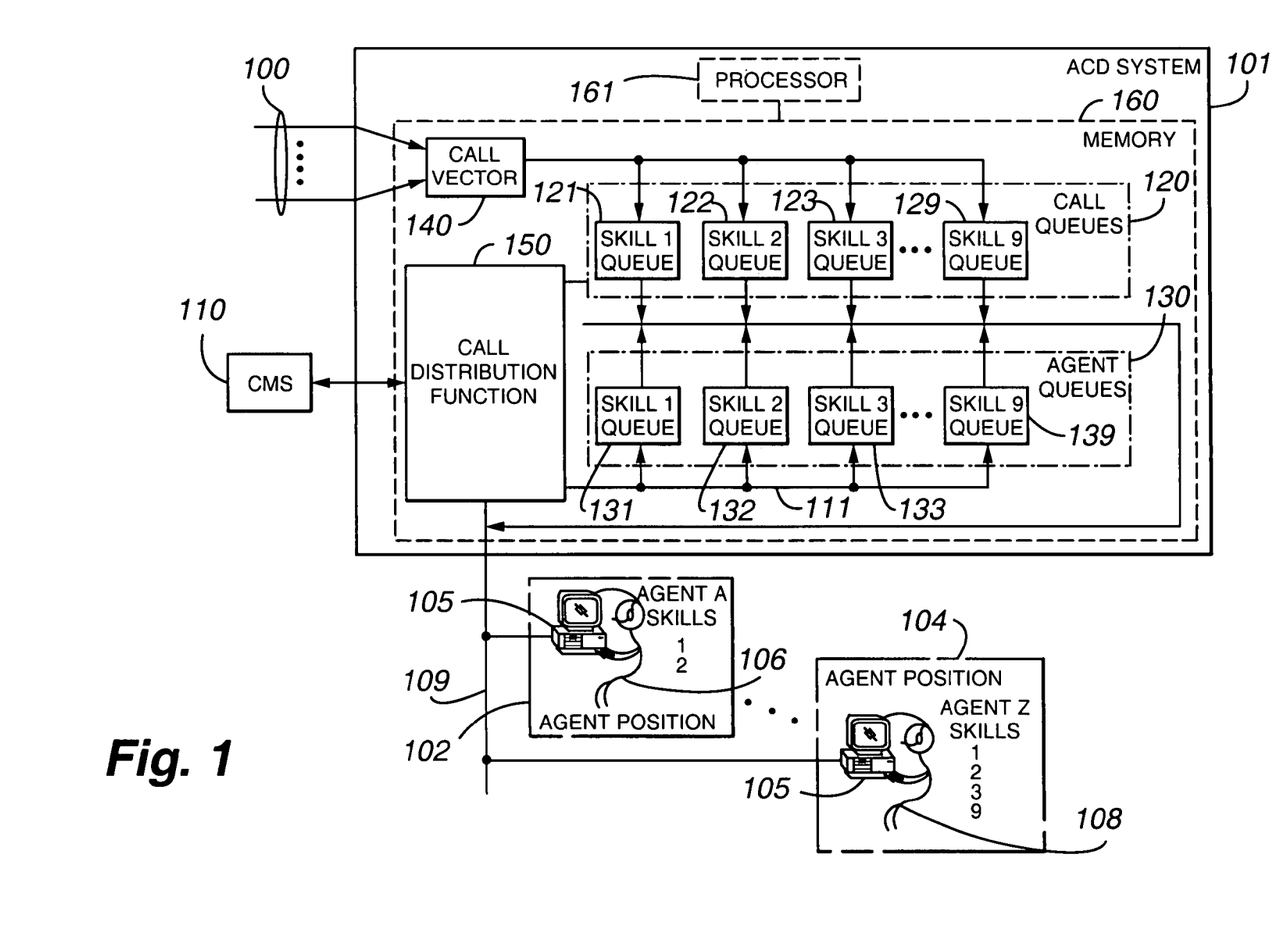
FIG. 1 is a block diagram of a call center that includes an illustrative embodiment of the present invention.

FIG. 1 is a block diagram of an illustrative call center, such as may be used in accordance with embodiments of the present invention. The call center comprises a plurality of telephone lines and/or trunks 100 selectively interconnected with a plurality of agent positions 102–104 via an automatic call distribution (ACD) system 101. Each agent position 102–104 includes a voice and data terminal 105 for use by a corresponding agent 106–108 in handling calls. Terminals 105 are connected to the ACD system 101 by a voice and data transmission medium 109. Also connected to ACD system 101 is a conventional call management system (CMS) 110 that gathers call records and call center statistics for use in managing the call center and in generating call center reports.

ACD system 101 is illustratively the MultiVantage™ Enterprise Communications System based ACD system available from Avaya Inc. It is a stored program controlled system that conventionally includes interfaces to external communications links, a communications switching fabric, service circuits (e.g., tone generators, announcement circuits, etc.), memory 160 for storing control programs and data, and a processor 161 for executing the stored control programs to control the interfaces and the fabric and to provide automatic call-distribution functionality. Included among the data stored in the memory 160 of ACD system 101 are a set of call queues 120 and a set of agent queues Each call queue 121–129 corresponds to a different agent skill, as does each agent queue 131–139. Accordingly, for each call queue 121–129 there typically exists a corresponding agent queue 131–139, forming a queue pair. However, such a one-to-one correspondence between call queues 121–129 and agent queues 131–139 is not necessary. Conventionally, calls are prioritized, and either are enqueued in individual ones of call queues in their order of priority or are enqueued in different ones of a plurality of call queues that correspond to a skill and each one of which corresponds to a different priority. Included among the control programs in the ACD system 101 is a call vector 140 that assigns calls incoming on lines or trunks 100 to different call queues 121–129 based upon the agent skill or skills that they require for their proper handling. Furthermore, a call may be handled by agents having different skills, and therefore may be assigned to multiple call queues 121–129 simultaneously, most likely at different priorities. If an agent is not immediately available to handle an incoming call, the call will be held in the assigned call queue or queues 121–129. If a number of agents are available, the call may be handled by the agent in the appropriate agent queue with the lowest occupancy, or according to some other criterion.

In general, agents 106–108 who are available for handling calls are assigned to agent queues 131–139 based upon the skills that they possess. An agent may have multiple skills, and therefore may be assigned to multiple agent queues 131–139 simultaneously. In addition, in accordance with an embodiment of the present invention, an agent may be reserved for a particular agent queue or queues 131–139, so that the agent is only assigned calls or other work associated with the agent queue or queues 131–139 for which they are reserved. In particular, in accordance with embodiments of the present invention, agents having a particular skill that become available may be reserved to an agent queue 131–139 associated with that skill until a target service level is reached, or until a selected maximum number of agents defined for the queue has been reached. In addition, the present invention allows an agent assigned to and reserved for a particular agent queue 131–139 to be replaced by an available agent based on an assessment of agent skills and occupancy, as described more fully below.

Figure 2:
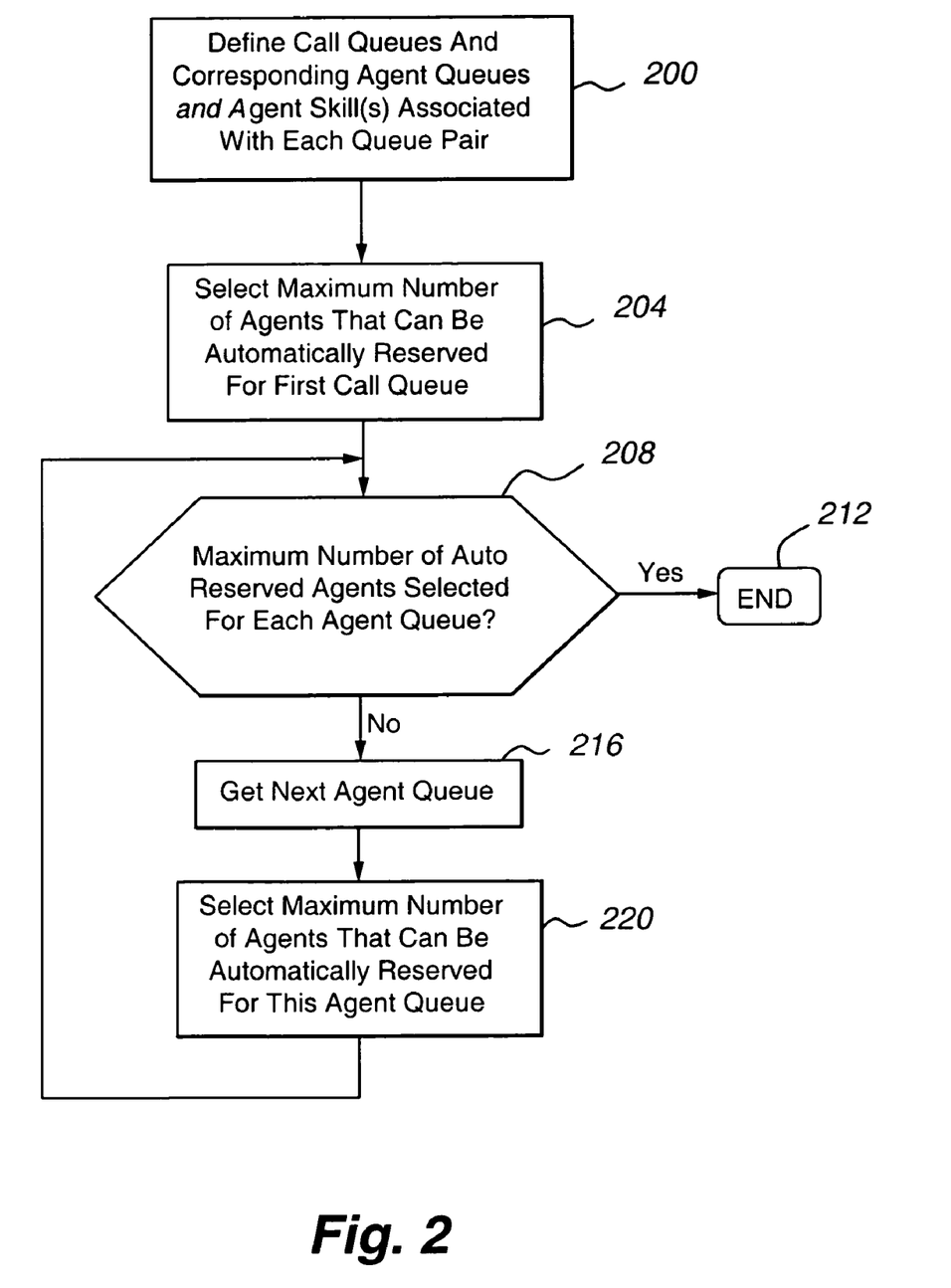
FIG. 2 is a flow diagram illustrating a process for establishing agent queues and a maximum number of agents reserved for each queue in accordance with an embodiment of the present invention.

With reference now to FIG. 2, a process for establishing call queues and agent queues and a maximum number of agents reserved for each queue is illustrated. Initially, at step 200, call queues and agent skills associated with each call queue, and agent queues and agent skills associated with each agent queue, are defined. In general, the number of call queues 123–129, agent queues 131–139, and agent skills defined in connection with a system depend, at least in part, on the size and complexity of the system. For example, where a call center is established in connection with an enterprise having a wide range of operations, or where the call center is involved in servicing a number of disparate enterprises, a relatively large number of call queues and agent skills may be defined. For call centers handling relatively small volumes of calls or that handle a relatively narrow range of topics, a smaller number of call queues and agent skills may be defined.

At step 204, a value setting the maximum number of agents that can be automatically reserved to receive calls placed in a first call queue (i.e., that can be reserved for a particular agent queue 131–139) is selected. In general, the allocation of agents to agent queues 131–139 can be more closely controlled using the present invention as compared to other approaches, because of the ability to specify a maximum number of reserved agents for each queue. In particular, while other systems will reserve available agents to a queue so long as a target service level associated with the queue has not been met, the present invention ensures that the number of agents reserved for a particular agent queue 131–139 is limited. In addition, it should be appreciated that, in accordance with an embodiment of the present invention, the selected maximum number of reserved agents can be zero. If the selected maximum number of agents reserved for a particular queue is zero, agents will not be held in reserve to await calls associated with that queue.

At step 208, a determination is made as to whether a value setting the maximum number of automatically reserved agents has been selected for each agent queue. If a value setting the maximum number of automatically reserved agents has been selected for each agent queue, the process ends (step 212). If a value setting the maximum number of automatically reserved agents has not been selected for each agent queue, the next agent queue is obtained (step 216) and a value setting the maximum number of agents that can be automatically reserved for the agent queue is selected (step 220). The process then returns to step 208.

Figure 3:
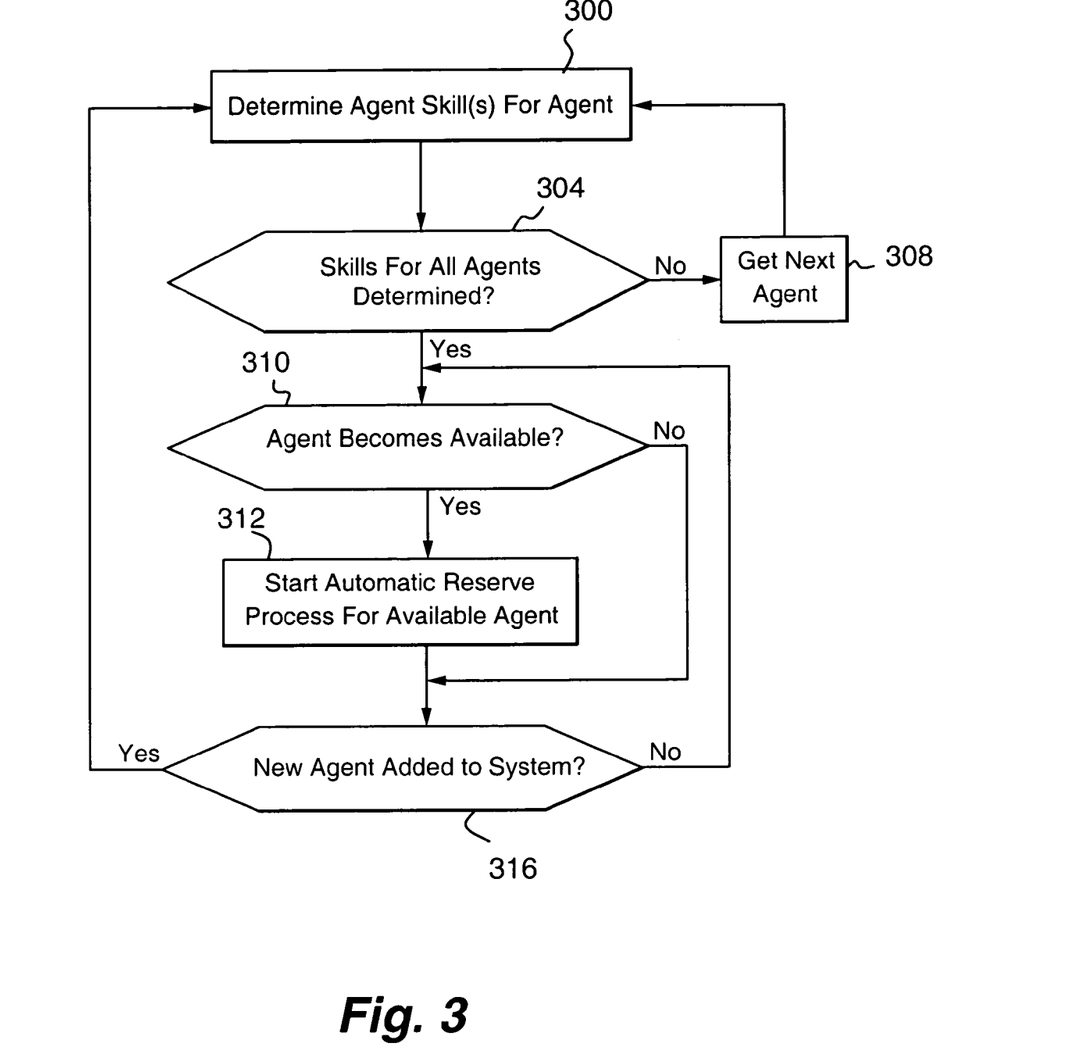
FIG. 3 is a flow diagram illustrating a process for allocating agents in accordance with an embodiment of the present invention.

With reference now to FIG. 3, a process for determining the skills possessed by each agent associated with a system and for allocating those agents to agent queues 131–139 in accordance with an embodiment of the present invention is illustrated. Initially, at step 300, the agent skills for the agent under consideration are determined. As can be appreciated by one of skill in the art, one or more agent skills may be associated with each agent. In general, an agent skill is defined as a particular qualification or set of qualifications that are required in order to perform work, such as servicing calls, of a particular type. For example, a first agent skill may be defined in connection with handling calls from customers regarding a first topic, while a second agent skill may be defined in connection with handling calls from customers regarding a second topic. At step 304, a determination is made as to whether skills for all agents associated with the system have been determined. If agents for whom skills have not been determined remain, the next agent is obtained (step 308) and the process returns to step 300, at which point skills for that next agent are determined.

If skills for all agents associated with the system have been determined, the process next determines whether an agent has become available (step 310). In general, an agent becomes available when the agent initially logs into the system, or after an agent has completed an assigned work item. Upon an agent becoming available, the automatic reservation process for the available agent is started (step 312). Steps that may be taken in connection with automatic reservation processes in accordance with embodiments of the present invention are discussed in detail in connection with FIGS. 4, 5 and 6 of the present disclosure.

After the automatic reservation process for the available agent has been started, or if no agent is currently available, a determination is made as to whether a new agent has been added to the system (e.g., has signed into the system) (step 316). If a new agent has been added to the system, the process returns to step 300. If a new agent has not been added to the system, the system returns to step 310. Accordingly, it can be appreciated that the process of determining agent skills and performing automatic reservation processes with respect to agents can be performed continuously.

Figure 4:
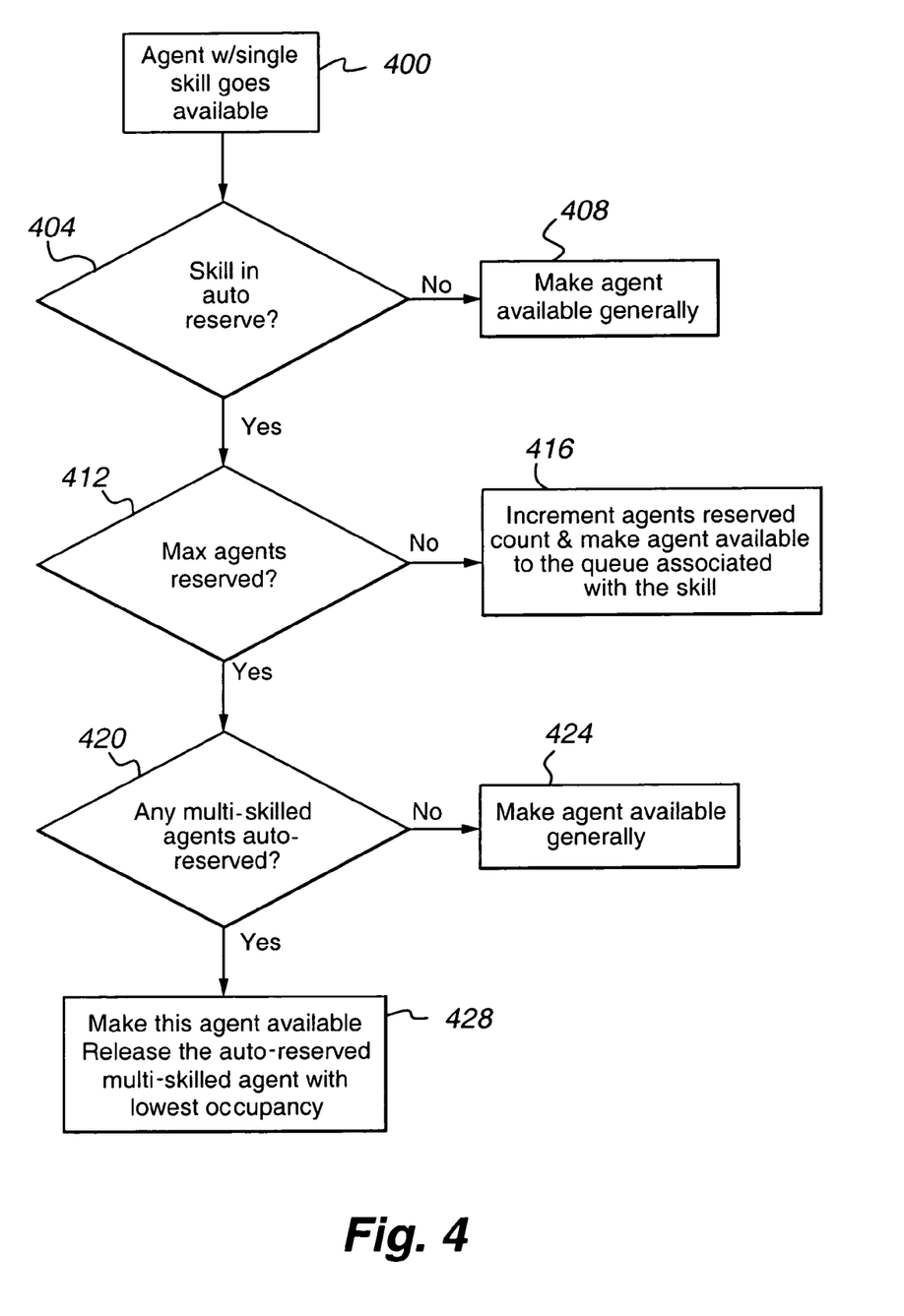
FIG. 4 is a flow diagram illustrating the assignment of an agent having a single skill to a call queue in accordance with an embodiment of the present invention.

With reference now to FIG. 4, a process for automatically reserving an available agent having a single agent skill in accordance with an embodiment of the present invention is illustrated. Initially, at step 400, an agent with a single associated skill becomes available. At step 404, a determination is made as to whether the agent skill held by the available agent is an auto reserve skill. A skill is an auto reserve skill if available agents are automatically reserved for servicing calls associated with the agent skill under consideration. As an example, a skill may be placed in auto reserve, and thus be an auto reserve skill, if service target levels for the skill are not being met. If the subject agent skill is not in auto reserve, the agent is made generally available (step 408).

If the subject skill is in auto reserve, a determination is made as to whether the selected maximum number of agents have already been reserved for the agent queue associated with the skill (step 412). If it is determined that the selected maximum number of agents that can be reserved for the agent queue has not been reached, the agent reserved count is incremented, and the agent is made available to receive calls from the call queue associated with the agent queue for the subject skill (step 416). According to an embodiment of the present invention, the number of agents reserved count is decremented for a skill if an agent that had been reserved for the skill takes a call, changes state, or otherwise becomes unavailable.

If the maximum number of agents that can be reserved for the agent queue associated with the subject skill has been reached, a determination is made as to whether any multi-skilled agents have been automatically reserved for the agent queue (step 420). That is, a determination is made as to whether there are any multi-skilled agents that are presently in the agent queue established in connection with the subject agent skill. If there are no multi-skilled agents currently assigned to the agent queue, the first agent is made available generally (i.e., the first agent is not automatically reserved for the agent queue associated with the subject agent skill) (step 424).

If there are any multi-skilled agents reserved for the agent queue, the first agent is made available and is reserved for the first agent queue (step 428). Also at step 428, the multi-skilled agent in the first agent queue is released (i.e., is no longer reserved for the first agent queue and is made generally available). Where a number of multi-skilled agents have been reserved for the first agent queue, the multi-skilled agent having the lowest occupancy is released. Accordingly, embodiments of the present invention may continually or periodically update the occupancy associated with each agent. As can be appreciated by one of skill in the art, an agent's occupancy can be defined by the ratio between the agent's total time at work (i.e., staffed) and the actual time that the agent has spent working.

Figure 5:
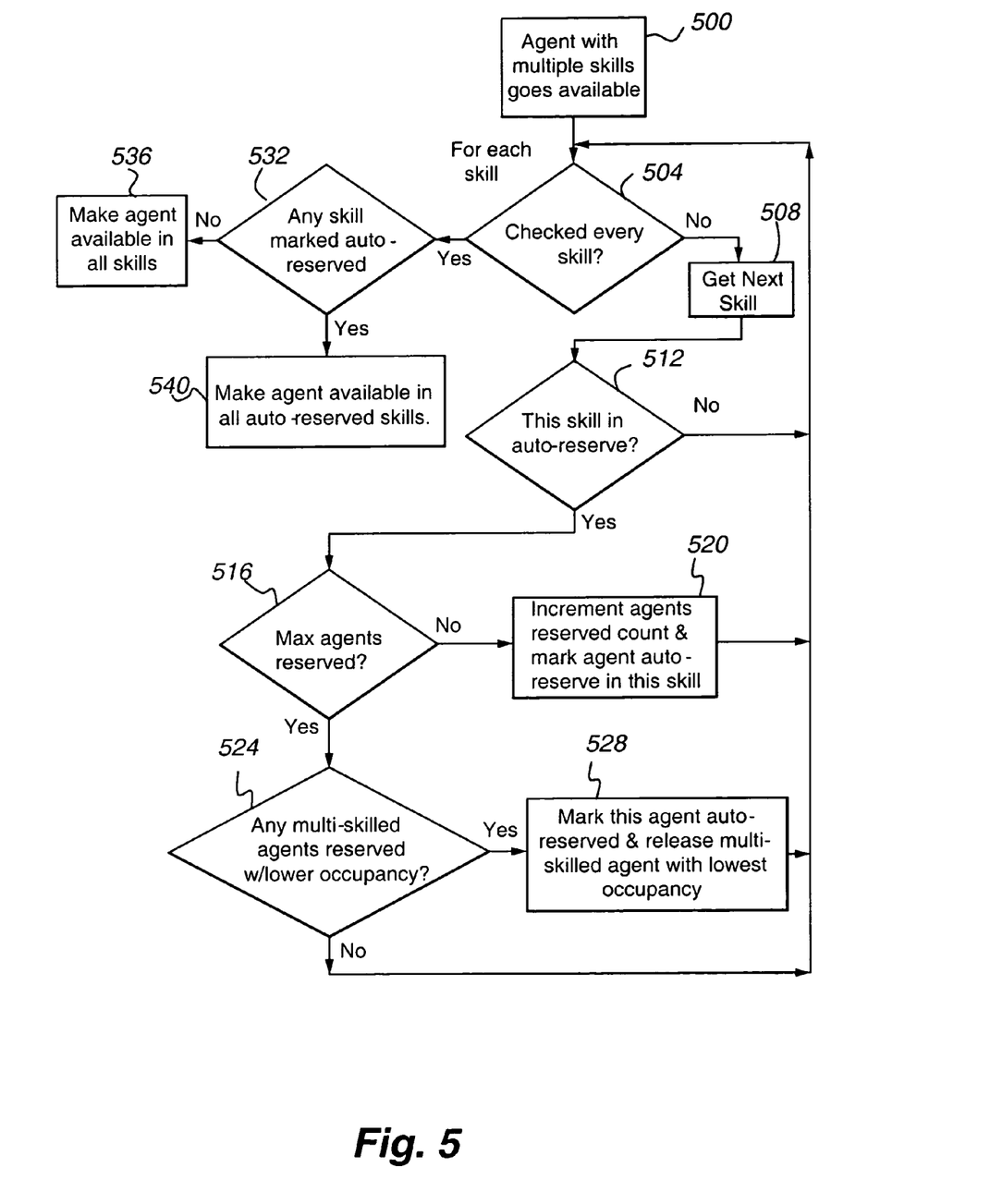
FIG. 5 is a flow diagram illustrating the assignment of an agent having multiple skills to a call queue in accordance with an embodiment of the present invention.

With reference now to FIG. 5, a process in accordance with an embodiment of the present invention for automatically reserving an agent having multiple skills that becomes available is illustrated. Initially, at step 500, a first agent having multiple skills becomes available. At step 504, a determination is made as to whether every agent skill associated with the first agent has been checked. If the determination is that every skill has not been checked, a next (e.g., a first) skill is obtained (step 508). At step 512, a determination is made as to whether the agent queue associated with the currently selected skill is in auto reserve. If the skill is not in auto reserve, the process returns to step 504.

If the subject skill is in auto reserve, a determination is made as to whether the selected maximum number of agents that can be reserved in connection with the subject skill has been reached (516). If the selected maximum number has not been reached, the first agent is marked for automatic reservation into the subject skill, and the count of agents reserved for the skill in incremented (step 520). The process may then return to step 504. In accordance, with an embodiment of the present invention, the count of agents reserved for a skill is decremented when an agent that had been reserved for the skill takes a call, changes state, or otherwise becomes available.

If the selected maximum number of agents has been reached, a determination is made as to whether any multi-skilled agents having a lower occupancy than the agent under consideration are currently reserved for the skill (step 524). If no multi-skilled agent having a lower occupancy (or no multi-skilled agent) is reserved for the skill, the agent under consideration is not marked for automatic reservation into the skill, and the process returns to step 504.

If any multi-skilled agent having a lower occupancy than the agent under consideration is reserved for the skill, the agent under consideration is marked auto-reserved for the skill, and the multi-skilled agent having a lower occupancy is released (step 528). In addition, if there are a number of multi-skilled agents having a lower occupancy than the agent under consideration, the multi-skilled agent with the lowest occupancy is released. As an alternative to releasing an agent or agents having a lower occupancy than the agent under consideration, the agent or agents having the fewest skills are released from auto reserve, if the agent under consideration has more auto-reserved skills. The system then returns to step 504.

If at step 504 it is determined that every agent skill associated with the system has been checked, a determination is next made as to whether the agent under consideration has been marked auto-reserved with respect to any agent skill (i.e. with respect to any agent queue)(step 532). If the agent under consideration has not been automatically reserved for any skill, the agent is made available with respect to all of the agent's skills, or to perform work that does not require any particular skill (step 536). If the agent under consideration has been marked as auto-reserved with respect to any skill, the agent is made available in all skills for which that agent has been automatically reserved, and is not made available in skills that are not auto-reserved (step 540).

From the above description, it can be appreciated that a multi-skilled agent can be simultaneously reserved with respect to more than one agent skill. That is, a multi-skilled agent may be placed in more than one agent queue simultaneously. This feature of embodiments of the present invention allows agent occupancy to be maximized. In addition, such an embodiment of the present invention allows multi-skilled agents having a low occupancy to be released from an agent queue to perform other work.

Figure 6:
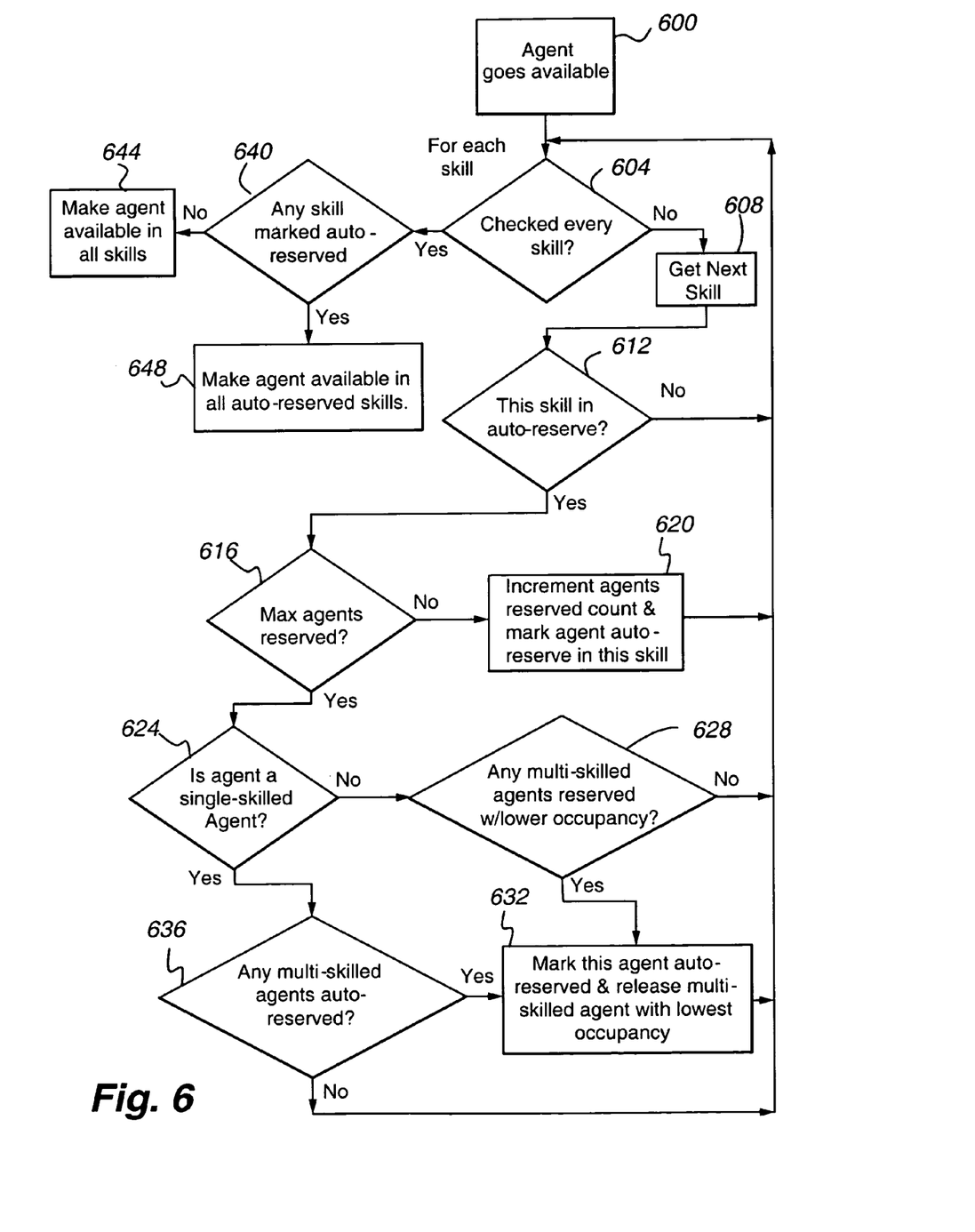
FIG. 6 is a flow diagram of the operation of a system in allocating an agent to a call queue in accordance with an embodiment of the present invention.

With reference now to FIG. 6, the operation of a system for automatically reserving agents to perform work in connection with an embodiment of the present invention is illustrated. In particular, FIG. 6 illustrates an example of how a system in accordance with an embodiment of the present invention can continually reserve and release single and multi-skilled agents to help ensure the efficient use of available agent skills, and to equalize the occupancies of agents. Initially, at step 600, a first agent becomes available. At step 604, a determination is made as to whether every agent skill associated with the first agent has been checked. If skills remain to be checked, the next (e.g., the first) skill is obtained (step 608).

At step 612, a determination is made as to whether the skill currently under consideration is in auto reserve. If the skill is not in auto reserve, the process returns to step 604.

If the skill under consideration is below the service target, a determination is next made as to whether a selected maximum number of agents for the skill have been reserved (step 616). If the selected maximum number of agents has not been reached, the first agent is marked auto reserved in the subject skill (i.e., the agent is marked auto-reserved for the associated agent queue), and the agents reserved count for this skill is incremented (step 620). According to an embodiment of the present invention, if an agent assigned to a skill takes a call, changes state, or otherwise becomes unavailable, the agents reserved count for the skill is decremented. The process then returns to step 604.

If the maximum number of agents for the skill has been reserved, a determination is next made as to whether the first agent is a single-skilled agent (step 624). If the first agent is not a single-skilled agent, a determination is made as to whether any multi-skilled agents having a lower occupancy than the first agent have been reserved with respect to the subject skill (step 628). If no multi-skilled agent having a lower occupancy than the first agency is found, the system returns to step 604.

If a multi-skilled agent having a lower occupancy is currently reserved for the subject skill, the first agent is marked auto-reserved for the subject skill, and the multi-skilled agent having a lower occupancy is released to perform other work (step 632). Where a number of multi-skilled agents are currently reserved for the subject skill, the multi-skilled agent having the lowest occupancy is released from the agent queue for the subject skill. The system then returns to step 604.

If at step 624 it is determined that the first agent is a single-skilled agent, a determination is next made as to whether any multi-skilled agents are currently automatically reserved (step 636). If multi-skilled agents are auto reserved for the subject skill, the first agent is marked auto reserved and the multi-skilled agent is released to perform other work (step 632). Again, if a number of multi-skilled agents are currently reserved, the multi-skilled agent having the lowest occupancy is released to perform other work at step 632. After replacing a multi-skilled agent with the single-skilled agent at step 632, or if no multi-skilled agents have been auto reserved for the subject skill, the system returns to step 604.

If at step 604 it is determined that every agent skill associated with the first agent has been checked, a determination is next made up as to whether the first agent has been marked for automatic reservation into any of the skills (step 640). If the first agent has not been marked for automatic reservation into any skill, the agent is made available with respect to all of the agent's skills (step 644). For example, even though the first agent may not have been reserved for handling calls sent to a specific call queue, the agent may nonetheless be assigned to service such a call as a result of conventional call distribution functions included in the system.

If at step 640 it is determined that the first agent has been marked for automatic reservation into any skill, the first agent is reserved with respect to all such skills (i.e., the agent is reserved for each agent queue corresponding to each agent skill for which the first agent has been marked reserved) (step 648).

In addition, embodiments of the present invention may auto reserve an agent having a single skill in place of a single-skilled agent already reserved for the agent queue corresponding to the agent skill where the occupancy of the reserved agent is less than that of the available agent, and where there are no multi-skilled agents that can be replaced by the available agent.

Although the foregoing description has used as examples a system comprising a call center staffed by human agents, it should be appreciated that the present invention is not so limited. For example, embodiments of the present invention may be utilized in connection with the reservation of any resource to perform work of a particular type. Furthermore, it should be appreciated that the present invention, while particularly useful in connection with the reservation and release of agents in real-time, may be utilized in connection with systems in which agents may be reserved to particular queues for extended periods of time. For example, in addition to substantially real-time call distribution system applications, the present invention may be applied to systems used to distribute work items comprising textual correspondence to resources for action and possible reply. Embodiments of the present invention are also not limited to operation on a switch. For example, embodiments of the present invention may be implemented as a separate application.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for reserving call center agents, comprising:
   establishing a first call queue associated with a first agent skill;
   establishing a first agent queue for agents reserved to receive calls from said first call queue;
   selecting a maximum number of agents that can be automatically reserved for said first agent queue;
   determining a number of agents reserved for said first agent queue;
   detecting a first available agent, wherein said first agent has at least a first agent skill;
   determining a total number of agent skills associated with said first available agent;
   in response to a determination that said number of agents reserved for said first agent queue at least one of equals or exceeds said selected maximum number, at least one of:
   1) in response to a determination that only said first agent skill is associated with said first agent, determining whether a second agent having a number of associated agent skills is reserved for said first agent queue; and in response to a determination that a second agent having a number of associated agent skills is reserved for said first agent queue, releasing said second agent from being reserved for said first agent queue; and 2) in response to a determination that a plurality of agent skills are associated with said first agent at least one of:
   (a) (i) determining an occupancy of said first agent;
      (ii) identifying a second agent reserved for said first agent queue having a plurality of agent skills and having an occupancy that is less than said occupancy of said first agent; and
      (iii) releasing said second agent from being reserved for said first agent queue; and
   (b) (i) determining a number of agent skills of said first agent;
      (ii) identifying a second agent reserved for said first agent queue having a plurality of agent skills and having fewer agent skills in auto-reserve than said number of agent skills; and
      (iii) releasing said second agent from being reserved for said first agent queue; and reserving said first agent for said first agent queue.

2. The method of claim 1, wherein said first agent has a plurality of agent skills, and wherein a number of agents reserved for said first agent queue have a plurality of agent skills, said method further comprising:
determining an occupancy of each of said agents reserved for said first agent queue having a plurality of agent skills, wherein said second agent released from being reserved for said first agent queue is an agent having a lowest occupancy.

3. The method of claim 1, wherein said first agent has a plurality of agent skills, and wherein said occupancy of said first agent comprises a proportion of agent staff time spent performing useful work.

4. The method of claim 1, wherein said first agent queue is in auto reserve.

5. The method of claim 4, wherein a service target for said first call queue is not being met.

6. The method of claim 1, wherein a number of agent skills comprising a number of reserved agent skills of said first agent are determined, and wherein a second agent having a plurality of reserved agent skills is identified.

7. A computational component for performing a method, the method comprising:
identifying a first available agent having a first agent skill;
identifying a first call queue, wherein said first call queue is associated with said first agent skill, and wherein no more than a first predetermined maximum number of agents can be automatically reserved to receive calls from said first call queue;
determining that a number of agents reserved to receive calls placed in said first call queue is equal to said first predetermined maximum number of agents;
at least one of:
   1) identifying a second agent having a plurality of agent skills; and
   releasing said second agent from being reserved to receive calls placed in said first call queue;
   2) determining that said first agent has a plurality of agent skills;
   determining that a number of agents reserved to receive calls placed in said first call queue is equal to said first predetermined maximum number of agents;
   calculating an occupancy of said first available agent;
   identifying a second agent reserved to receive calls placed in said first call queue having a plurality of agent skills and having an occupancy that is less than said occupancy of said first agent;
   releasing said second agent from being reserved to receive calls placed in said first call queue; and
   3) determining that said first agent has a plurality of agent skills;
   determining a number of agent skills of said first agent;
   identifying a second agent reserved for said first call queue having fewer agent skills in auto-reserve than said first agent;
   releasing said second agent from being reserved to receive calls placed in said first call queue; and
reserving said first available agent to receive calls placed in said first call queue.

8. The method of claim 7, wherein said first agent has at least said first agent skill and a second agent skill, said method further comprising:
identifying a second call queue, wherein said second call queue is associated with said second agent skill, and wherein no more than a second predetermined maximum number of agents can be reserved to receive calls from said first call queue; and
assigning said first available agent to said second call queue, wherein said first agent is simultaneously assigned to said first call queue and said second call queue.

9. The method of claim 7, wherein said first agent has at least said first agent skill and a second agent skill, and wherein said agent is reserved for said first call queue and is not made available for a second call queue associated with said second skill.

10. The method of claim 7, wherein said occupancy comprises a ratio of an agent's work time to the total time said agent has been at work.

11. The method of claim 10, wherein said work time comprises talk time and after call work time.

12. The method of claim 7, wherein said first predetermined maximum number is a finite number.

13. The method of claim 7, wherein said first predetermined maximum number is zero.

14. The method of claim 7, wherein said computational component is part of a call center.

15. The method of claim 7, wherein a target service level for said first call queue is not being met.

16. The method of claim 7, wherein said computational component comprises a computer readable storage medium containing instructions for performing the method.

17. The method of claim 7, wherein said computational component comprises a logic circuit.

18. A system for assigning work to an agent, comprising:
means for interfacing with a communication network;
means for detecting a status of agents associated with said system;
means for determining agent skills associated with an agent;
means for maintaining a call queue associated with a first defined agent skill;
means for storing a maximum number of agents that can be automatically reserved for said agent queue;
means for determining an occupancy of individual agents, means for maintaining an agent queue, wherein agents in said agent queue receive calls from said call queue; and wherein a first available agent is reserved for said agent queue, wherein in response to said first available agent having only said first defined agent skill said first available agent replaces a second agent having multiple skills in said queue of agents; and wherein in response to said first available agent having multiple agent skills and a first occupancy and a second agent has multiple agent skills and a second occupancy that is less than said first occupancy said first available agent replaces said second agent in said agent queue.

19. The system of claim 18, wherein said second agent has a lowest occupancy among all agents in said queue of agents.

20. The system of claim 18, further comprising:
a communication network; and
a plurality of agent stations, wherein a call received from said communication network associated with a first defined agent skill is distributed to an agent station associated with an agent reserved for said call queue associated with said first defined agent skill.

21. The system of claim 18, wherein a service target level for said call queue associated with a first defined agent skill is not being met.

22. A system for assigning work to an agent, comprising:
means for interfacing with a communication network;
means for detecting a status of agents associated with said system;
means for determining agent skills associated with an agent;
means for maintaining a call queue associated with a first defined agent skill;
means for storing a maximum number of agents that can be automatically reserved for said agent queue;
means for maintaining an agent queue, wherein agents in said agent queue receive calls from said call queue; and
wherein a first available agent is reserved for said agent queue, wherein in response to said first available agent having only said first defined agent skill said first available agent replaces a second agent having multiple skills in said queue of agents; and
wherein in response to said first available agent having a number of agent skills that is less than a number of agent skills of a second agent said first available agent replaces said second agent in said agent queue.

23. The system of claim 22, wherein said second agent has a lowest number of agent skills among all agents in said queue of agents.

24. The system of claim 22, further comprising:
a communication network; and
a plurality of agent stations, wherein a call received from said communication network associated with a first defined agent skill is distributed to an agent station associated with an agent reserved for said call queue associated with said first defined agent skill.

25. The system of claim 22, wherein a service target level for said call queue associated with a first defined agent skill is not being met.

26. A call distribution system, comprising:
a communication network interface;
memory, comprising:
a) at least a first agent queue associated with a first agent skill,
b) a value setting a maximum number of agents that can be reserved in said first agent queue, and
c) an application program containing instructions to place an available agent having said first agent skill in said first agent queue and for determining a number of agent skills associated with an agent, wherein in response to said first agent having only said first skill a multi-skilled agent in said first queue is replaced by said first agent in said first agent queue, and wherein in response to said first agent having a plurality of skills a multi-skilled agent having at least one of a lower occupancy and a lower number of agent skills than said first agent is replaced by said first agent in said first agent queue; and
a processor capable of executing the instructions included in said application program.

27. The call distribution system of claim 26, wherein said system comprises an automatic call distribution system.

* * * * *